(12) United States Patent
Lee et al.

(10) Patent No.: US 11,763,562 B2
(45) Date of Patent: *Sep. 19, 2023

(54) IMAGE PROCESSING APPARATUS AND CONTROL METHOD THEREOF

(71) Applicant: SAMSUNG ELECTRONICS CO., LTD., Suwon-si (KR)

(72) Inventors: Jong In Lee, Suwon-si (KR); Sung Hyun Kim, Suwon-si (KR); Yong Deok Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 44 days.

This patent is subject to a terminal disclaimer.

(21) Appl. No.: 17/543,792

(22) Filed: Dec. 7, 2021

(65) Prior Publication Data

US 2022/0092337 A1    Mar. 24, 2022

Related U.S. Application Data

(63) Continuation of application No. 16/688,560, filed on Nov. 19, 2019, now Pat. No. 11,200,465.

(30) Foreign Application Priority Data

Nov. 19, 2018    (KR) .................... 10-2018-0142609

(51) Int. Cl.
*G06V 20/40* (2022.01)
*G06N 3/04* (2023.01)
(Continued)

(52) U.S. Cl.
CPC .......... *G06V 20/41* (2022.01); *G06F 18/2413* (2023.01); *G06N 3/04* (2013.01);
(Continued)

(58) Field of Classification Search
CPC ........ G06F 18/2413; G06N 3/04; G06N 3/08; G06V 10/25; G06V 10/82; G06V 10/95;
(Continued)

(56) References Cited

U.S. PATENT DOCUMENTS 8,666,918 B2    3/2014    Sikora
2010/0039557 A1    2/2010    Mori
(Continued)

FOREIGN PATENT DOCUMENTS

EP    2 066 122 A1    6/2009
EP    2 239 934 A1    10/2010

OTHER PUBLICATIONS

Communication dated Apr. 13, 2021 by the European Patent Office in counterpart European Patent Application No. 19209868.9.
(Continued)

*Primary Examiner* — Juan A Torres
(74) *Attorney, Agent, or Firm* — Sughrue Mion, PLLC

(57) ABSTRACT

Provided are an image processing apparatus and a control method thereof. The image processing apparatus includes: a communication circuitry configured to communicate with an external device; a storage configured to store data; an image processor configured to perform image processing; and a controller configured to perform an operation, through a neural network, on an image frame contained in an image received by the communication circuitry, to determine a type of the image based on information according to the operation through the neural network, and to control the image processor based on the determined type of the image.

22 Claims, 10 Drawing Sheets

(51) Int. Cl.
    *G06N 3/08*           (2023.01)
    *G06F 18/2413*    (2023.01)
    *G06V 10/82*      (2022.01)
    *G06V 10/94*      (2022.01)

(52) U.S. Cl.
    CPC ............... *G06N 3/08* (2013.01); *G06V 10/82* (2022.01); *G06V 10/95* (2022.01)

(58) Field of Classification Search
    CPC .. G06V 20/41; G06T 7/00; G06T 1/20; G06T 5/002; G06T 2207/20084
    USPC ....................................................... 382/156
    See application file for complete search history.

(56) References Cited

U.S. PATENT DOCUMENTS

| | | |
|---|---|---|
| 2010/0253837 A1 | 10/2010 | Yim |
| 2010/0284623 A1 | 11/2010 | Chen |
| 2018/0032846 A1 | 2/2018 | Yang et al. |

OTHER PUBLICATIONS

Communication dated Apr. 22, 2020 by the European Patent Office in counterpart European Patent Application No. 19209868.9.

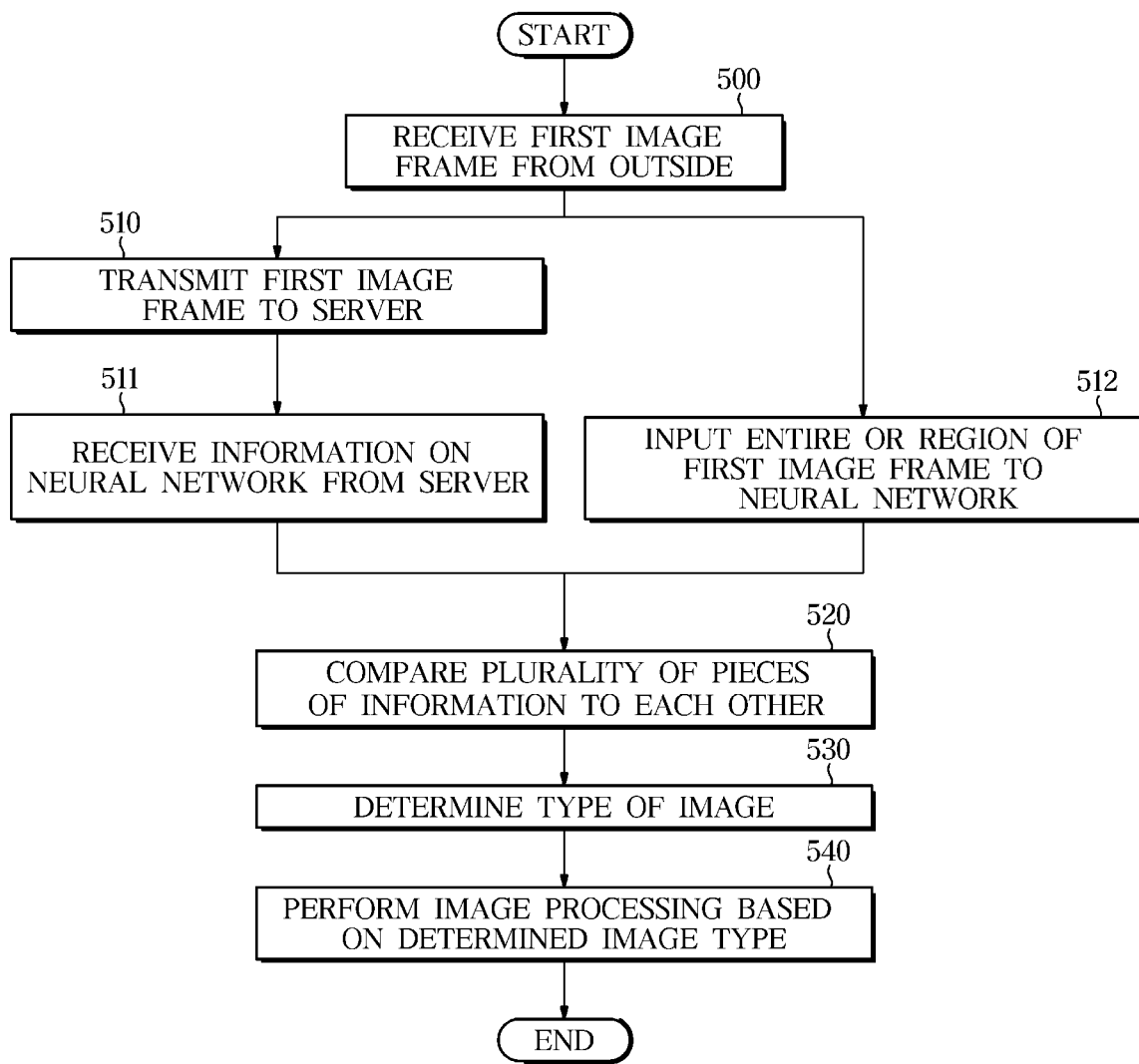

IMAGE PROCESSING APPARATUS AND CONTROL METHOD THEREOF

CROSS-REFERENCE TO RELATED APPLICATION(S)

This application is a continuation application of U.S. patent application Ser. No. 16/688,560, filed on Nov. 19, 2019, which is based on and claims priority under 35 U.S.C. § 119 to Korean Patent Application No. 10-2018-0142609, filed on Nov. 19, 2018, in the Korean Intellectual Property Office, the disclosures of which are incorporated by reference herein in their entirety.

BACKGROUND

1. Field

The disclosure relates to an image processing apparatus capable of determining the type of an image using deep learning and a control method thereof.

2. Description of the Related Art

Recently, as research and development have been made with respect to deep learning, which is a field of machine learning, studies for applying deep learning to industrial fields have been actively carried out. Deep learning is a method in which input values are pre-converted through pre-training before the input values are input to a neural network such as a multilayer perceptron, and a learning of the neural network is performed once more to overcome the limitation of the machine learning.

Meanwhile, an image processing apparatus for reproducing an input image performs various post-processing methods depending on the type of an image. For example, the post-processing method includes Frame Rate Conversion (FRC) that converts a frequency from 60 Hz to 120 Hz or 230 Hz. The FRC prevents motion blur and judder by generating an interpolated frame at the time of conversion.

When the type of image is a movie, the image processing apparatus may perform the FRC to improve the quality of the image. However, when the type of image is a game, a time difference may occur between an image output by a game player and an image output by a display apparatus, which may cause an unpleasant experience for a game player who desires a precise operation. Therefore, a technique of determining a type of an input image by the image processing apparatus would provide benefit.

A related art method of determining the type of the image has been disclosed in U.S. Pat. No. 8,666,918 B2. However, the above-described related art method is based on the input of various modules and image sequences, and has limitations in commercialization due at least to limitations of memory and operation speed in an on-device state.

SUMMARY

Provided is an image processing apparatus capable of determining the type of image in a limited on-device state by determining the type of image based on information that is output from an initial frame input to deep learning, and capable of securing the reliability of the determination.

Additional aspects will be set forth in part in the description which follows and, in part, will be apparent from the description, or may be learned by practice of the presented embodiments.

In accordance with an aspect of the disclosure, an image processing apparatus includes: a communication circuitry configured to communicate with an external device; a storage configured to store data; an image processor configured to perform image processing; and a controller configured to perform an operation, through a neural network, on an image frame contained in an image received by the communication circuitry, to determine a type of the image based on information according to the operation through the neural network, and to control the image processor based on the determined type of the image.

The information according to the operation through the neural network may include an image type and a reliability value of the image type with respect to the image frame; and based on the reliability value being less than a predetermined reference value, the controller may be configured to re-perform the operation, through the neural network, on the image frame or another image frame contained the image.

The controller may be configured to obtain a plurality of regions of the image frame based on at least one of a predetermined size and positions, and to perform the operation, through the neural network, on the obtained plurality of regions in a predetermined order.

The image processor may be configured to selectively perform at least one of noise processing or frame rate conversion (FRC).

The controller may be configured to determine the type of the image based on image types and reliability values of the image types according to performing of the operation, through the neural network, on a plurality of image frame regions or a plurality of image frames.

Based on all the reliability values being less than the predetermined reference value, the controller may be configured to determine the type of the image based on a highest reliability value among the reliability values.

The controller may be configured to perform the operation, through the neural network, on a first image frame contained in the image, and based on the reliability value of the first image frame being less than the predetermined reference value, the controller may be configured to perform the operation, through the neural network, on a second image frame, which is arranged a predetermined period after the first image frame.

The communication circuitry may be configured to receive a computer program for the neural network from a server, and the controller may be configured to request, from the server, an operation process through the neural network.

The controller may be configured to perform the operation, through the neural network, on a first image frame contained in the image and to transmit the first image frame to the server, and after the first image frame is transmitted to the server, the controller may be configured to determine the type of the image by comparing a first reliability value resulting from the operation with a second reliability value received from the server.

The controller may be configured to request an updated neural network from the server.

The controller may be configured to determine whether to perform the FRC based on the determined type of the image.

The neural network may include a convolution neural network (CNN) generating a feature map that is output by performing convolution on the image frame, and inputting the feature map into the neural network.

The storage may store a computer program related to the neural network, and the controller may be configured to perform the operation through the neural network based on the stored computer program.

In accordance with another aspect of the disclosure, a control method of an image processing apparatus, includes: performing an operation, through a neural network, on an image frame contained in an image; determining a type of the image based on information according to the operation through the neural network; and performing image processing based on the determined type of the image.

The information according to the operation through the neural network may include an image type and a reliability value of the image type with respect to the image frame; and based on the reliability value being less than a predetermined reference value, the performing the operation may include re-performing the operation, through the neural network, on the image frame or another image frame contained the image.

The re-performing the operation may include: obtaining a plurality of regions of the image frame based on at least one of a predetermined size and positions; and performing the operation, through the neural network, on the acquired plurality of regions in a predetermined order.

The performing the image processing may include selectively performing at least one of noise processing or frame rate conversion (FRC).

The determining the type of the image may include determining the type of the image based on a highest reliability value among a plurality of reliability values that are less than a predetermined reference value.

The control method may further include storing a computer program performing the operation through the neural network.

The performing the operation may include requesting the performing of the operation, through the neural network, to a server.

In accordance with another aspect of the disclosure, an image processing apparatus includes: an image processor configured to perform image processing on an image; and a controller configured to perform an operation, through a neural network, on an image frame contained in the image to determine a type of the image, and to control the image processor to perform the image processing based on the determined type of the image.

The controller may be configured to obtain, as an output of the operation from the neural network, an image type and a reliability value of the image type with respect to the image frame; and based on the reliability value being greater than a predetermined reference value, the controller may be configured to determine the image type as the type of the image.

Based on the reliability value being less than the predetermined reference value, the controller may be configured to re-perform the operation, through the neural network, on the image frame or another image frame contained the image.

The controller may be configured to crop the image frame and perform the operation, through the neural network, on the cropped image frame.

The controller may be configured to control the image processor to selectively perform at least one of noise processing or frame rate conversion (FRC) based on the determined type of the image.

The controller may be configured to determine the type of the image based on image types and reliability values of the image types according to performing of the operation, through the neural network, on a plurality of image frame regions or a plurality of image frames.

Based on all the reliability values being less than the predetermined reference value, the controller may be configured to determine the type of the image based on a highest reliability value among the reliability values.

In accordance with another aspect of the disclosure, a non-transitory computer-readable recording medium has recorded thereon instructions executable by at least one processor to perform the control method.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a flowchart illustrating a control method according to another embodiment.

DETAILED DESCRIPTION

Figure 1:
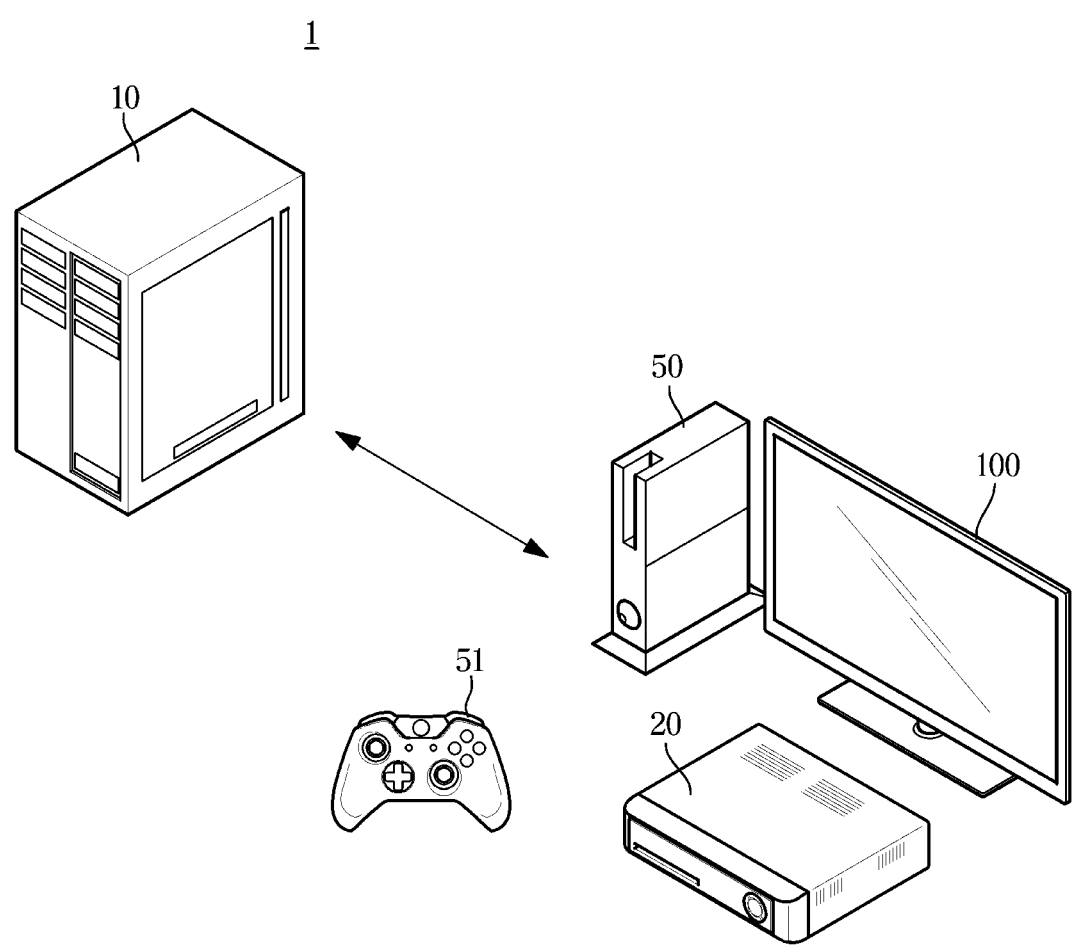
FIG. 1 is a view illustrating a system including a server and an image processing apparatus according to an embodiment.

In the following description, like reference numerals refer to like elements throughout the specification. Well-known functions or constructions are not described in detail since they would obscure the one or more exemplar embodiments with unnecessary detail. Terms such as "unit," "module," "member," and "block" may be embodied as hardware or software. According to embodiments, a plurality of "units," "modules," "members," and "blocks" may be implemented as a single component, and a single "unit," "module," "member," and "block" may include a plurality of components.

It will be understood that when an element is referred to as being "connected" to or with another element, it can be directly or indirectly connected to the other element, wherein the indirect connection may include "connection via a wireless communication network."

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, the elements are not be limited by these terms. These terms are only used to distinguish one element from another element.

As used herein, the singular forms "a," "an" and "the" are intended to include the plural forms as well, unless the context clearly indicates otherwise.

An identification code or number is used for the convenience of the description but is not intended to illustrate the order of each step. That is, each step may be implemented in the order different from the illustrated order unless the context clearly indicates otherwise.

Hereinafter, it is understood that expressions such as "at least one of," when preceding a list of elements, modify the entire list of elements and do not modify the individual elements of the list. For example, the expressions "at least one of [A], [B], and [C]" and "at least one of [A], [B], or [C]" means only A, only B, only C, A and B, B and C, A and C, or A, B, and C.

Reference will now be made in detail to embodiments, examples of which are illustrated in the accompanying drawings.

FIG. 1 is a view illustrating a system 1 including a server 10 and an image processing apparatus 100 according to an embodiment.

Referring to FIG. 1, a system 1 may include an image processing apparatus 100, and a server 10, a set-top box 20 and a game console 50 which are configured to provide an image to the image processing apparatus 100.

The image processing apparatus 100 refers to a device capable of displaying an image to a user after or based on processing the received image. In FIG. 1, the image processing apparatus 100 is shown as a television (TV) connected to the set-top box 20 and the game console 50. It is understood, however, that the image processing apparatus 100 is not limited thereto, and the image processing apparatus 100 may include a variety of devices capable of displaying an image such as a smart phone, a tablet personal computer, a mobile phone, a video phone, an e-book reader, a desktop PC, a laptop PC, a netbook computer, a workstation, a personal digital assistant (PDA), a portable multimedia player (PMP), an MP3 player, a mobile medical device, and a wearable device.

The set-top box 20 refers to a receiver for digital satellite broadcasting, and the set-top box 20 is configured to allow the image processing apparatus 100 to receive a digital broadcasting, which is provided from a broadcasting company, with an analog TV. Further, the set-top box 20 may include all kind of equipment that is required or used to implement an interactive TV and a video on demand (VOD) service. FIG. 1 illustrates that the set-top box is an external type that is connected to the outside of the image processing apparatus 100, but is not limited thereto. For example, according to another embodiment, the set-top box 20 may be an internal type.

The set-top box 20 provides an image player corresponding to a digital image such as a movie or drama, to the image processing apparatus 100.

The game console 50 refers to an interactive entertainment electronic device using a display signal such as a composite video signal or a high definition multimedia interface (HDMI) signal used in the image processing apparatus 100. Examples of the game console 50 include MICROSOFT XBOX and SONY PLAYSTATION.

The game console 50 provides a game image to the image processing apparatus 100 and processes a signal transmitted from a game pad 51. In addition, the game console 50 transmits an image, which is converted based on the processed signal, to the image processing apparatus 100.

The server 10 may include a streaming server or a relay server that provides Internet images to the image processing apparatus 100 through a network. In addition, the server 10 transmits a browser image to the image processing apparatus 100 through a network communication.

Further, the server 10 may update a neural network stored in the image processing apparatus 100 or store different versions of a neural network that are referred as deep learning.

Generally, in terms of hardware, the image processing apparatus 100 is limited in a memory and Computer Processor Unit (CPU) in comparison with the server 10. Therefore, the server 10 continuously updates weight, bias, and activation functions contained in the neural network to improve inference results of the neural network. The neural network updated in the server 10 is transmitted to the image processing apparatus 100 again to determine the types of images transmitted from the outside such as the set-top box 20 or the game console 50.

Further, the image processing apparatus 100 may receive images through various other electronic devices or networks in addition to the server 10, the set-top box 20, or the game console 50 described above. The image processing apparatus 100 performs an operation on an initial image frame of the received image using a pre-stored neural network, and determines the type of the received image based on a result (hereinafter referred to as information) of the operation performed through the neural network. For example, an image may include a game image, an image player image, or a browser image. The image processing apparatus 100 performs different post-processing, to improve a quality of the image, based on the determined image type and provides an image having the improved quality to a user.

Figure 2:
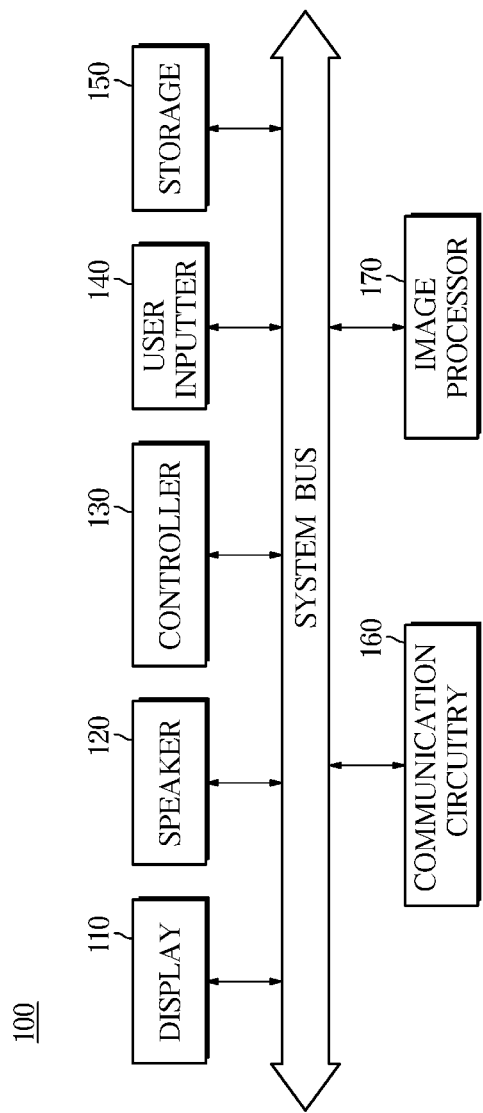
FIG. 2 is a control block diagram of an image processing apparatus according to an embodiment.

FIG. 2 is a control block diagram of an image processing apparatus 100 according to an embodiment.

Referring to FIG. 2, the image processing apparatus 100 includes communication circuitry 160 configured to receive an image from the outside, an image processor 170 configured to process the image received through the communication circuitry 160, a display 110 configured to display image data processed by the image processor 170, a speaker 120 configured to output audio data of the image processed by the image processor 170, an user inputter 140 configured to receive a command input by a user, a storage 150 for storing data, and a controller 130 (e.g., at least one processor) configured to perform an operation for processing of the image processor 170 and to perform a control of an operation of the image processing apparatus 100. These components are interconnected via a system bus.

Hereinafter, the controller 130 is described as being separate from the storage 150 and the image processor 170, but depending on embodiments, the controller 130 may be integrated with the image processor, e.g., implemented as a single system on chip (SOC) on which the image processor 170 is integrated.

The communication circuitry 160 may receive an image from at least one of the server 10, the set top box 20, or the game console 50 and may transmit various data processed by the controller 130 to the outside.

As well as receiving the image from the server 10, the communication circuitry 160 receives a computer program for the neural network updated by the server 10. The received neural network may be stored in the storage 150 in the form of a computer program. Hereinafter, execution of operations processed by the neural network in the coding form of a computer program will be described. It is understood, however, that the disclosure is not limited to the computer program in which the neural network is stored.

Using the neural network received by the communication circuitry 160, the controller 130 determines the type of the received image.

The communication circuitry 160 may receive the neural network from the server 10, or alternatively, the communication circuitry 160 may request the operation processing of the neural network or the update of the neural network from the server 10. Because the above-mentioned neural network refers to machine learning that forms a neural structure capable of performing deep learning, the weight and the bias corresponding to the configuration of the neural network continuously change, thereby improving the reliability of learning. Therefore, the communication circuitry 160 may also request the update of the received neural network to the server as well as receive the updated neural network from the server 10.

Meanwhile, the communication circuitry 160 may include at least one component capable of communication with an external device. For example, the communication circuitry 160 may include at least one of a short-range communication module, a wired communication module, and a wireless communication module.

The short-range communication module may include a variety of short range communication modules, configured to transmit and receive a signal using a wireless communication module over a short range, e.g., a Bluetooth module, an Infrared communication module, a Radio Frequency Identification (RFID) communication module, a Wireless Local Access Network (WLAN) communication module, a Near Field Communication (NFC) communication module, and a ZigBee communication module.

The wired communication module may include a variety of wired communication modules, e.g., a Local Area Network (LAN) module, a Wide Area Network (WAN) module, or a Value Added Network (VAN) module, and a variety of cable communication modules, e.g., a Universal Serial Bus (USB), a High Definition Multimedia Interface (HDMI), a Digital Visual Interface (DVI), a recommended standard 232 (RS-232) module, a power line communication module, or a plain old telephone service (POTS) module.

The wireless communication module may include a wireless communication module supporting a variety of wireless communication methods, e.g., a Wifi module, a Wireless broadband module, a Global System for Mobile (GSM) Communication module, a Code Division Multiple Access (CDMA) module, a Wideband Code Division Multiple Access (WCDMA) module, a Time Division Multiple Access (TDMA) module, and a Long Term Evolution (LTE) module.

The image processor 170 performs at least one of pre-processing or post-processing of the received image. In particular, the communication circuitry 160 may receive an image in the form of a modulated signal, and the image processor 170 may perform pre-processing to demodulate the signal. In addition, the image processor 170 may perform demuxing of the demodulated signal into an image signal.

The image processor 170 may perform various post-processing operations such as noise processing or Frame Rate Conversion (FRC) in addition to the basic image processing described above. Frame rate means a speed ratio of reproducing continuous images. The image processing apparatus 100 outputs a suitable number of image frames per second using human visual characteristics. The FRC is a post-processing for changing or adjusting the speed ratio of an output image frame.

For example, when the type of the received image is an image player image such as a movie, performing FRC helps improve image quality. However, when the type of the received image is a game image which requires immediate conversion by the user's input, performing FRC may cause motion judder or blur in the user's viewpoint. Accordingly, the image processing apparatus 100 determines the type of the received image and controls whether to perform the post-processing performed by the image processor 170 accordingly.

The display 110 displays image data processed by the image processor 170. There is no limit to the implementation of the display 110, and the display 110 may include a display panel that is a non-self-emission type such as a liquid crystal type or a display that is self-emission type such as an organic light emitting diode (OLED) type. In addition to the display panel, the display 110 may include an additional configuration depending on the implementation method of the display panel. For example, in the case of a liquid crystal type, the display 110 includes a liquid crystal display panel, a backlight unit for supplying light to the liquid crystal display panel and a panel drive substrate for driving the display panel.

The speaker 120 outputs an audio signal processed by the image processor 170 as a sound. The speaker 120 transmits a sound using the principle of changing air pressure by vibrating the air according to the audio signal. The speaker 120 may include a unit speaker corresponding to an audio signal of a certain channel and may include a plurality of unit speakers corresponding to a plurality of audio signals. The speaker 120 may include various types of speakers such as a woofer speaker, a mid-range speaker, and a tweeter speaker depending on the frequency band of the sound to be output, and one or more types thereof may be selected and then applied to the image processing apparatus 100.

According to a user's manipulation or input, the user inputter 140 transmits various predetermined control commands or information to the controller 130 or the image processor 170. The user inputter 140 transmits various events generated by a user's manipulation to the controller 130 or the image processor 170 according to a user's intention.

The user inputter 140 may be implemented in various forms according to an information input method. For example, the user inputter 140 may include a button provided outside the image processing apparatus 100, a touch screen provided on the display 110, a microphone to which a user's utterance is input, and a user interface environment installed in the image processing apparatus 100 such as a camera for imaging or detecting the environment. A remote controller may also be considered as one configuration of the user interface environment. However, because the remote controller is configured separately from the main body of the image processing apparatus 100, the remoter controller transmits a control signal to the image processing apparatus 100 through a separate control signal receiver (e.g., Infrared or Radio Frequency receiver) provided in the main body of the image processing apparatus 100.

The storage 150 stores various data generated or used in the process of the controller 130 or the image processor 170.

The storage 150 stores the neural network received from the server 10 and provides the stored neural network to the controller 130 when an image is input. For example, when an image frame of an image is input, the neural network may be coded to output the type of image, and the storage 150 may store the coded neural network.

By being accessed by the controller 130, the storage 150 reads, writes, edits, deletes, and updates data. The storage 150 may be implemented with non-volatile memory that stores data regardless of whether or not the system power of the image processing apparatus 100 is supplied, the non-volatile memory may include a flash memory, a hard-disc drive, and a solid-state (SSD).

Meanwhile, the storage 150 may not necessarily be separated from the controller 130 and provided as a separate memory, and may be formed as a single chip with the controller 130 in another embodiment. Therefore, one or more embodiments are not limited to the neural network being stored only in non-volatile memory.

The controller 130 may correspond to a component that performs a central operation for operating the configurations of the image processing apparatus 100 and may be a processor that plays a central role in interpreting and operating data. The controller 130 internally includes a processor register in which instructions to be processed are stored, an arithmetic logic unit (ALU) for performing comparison, determination, and operation, a control processor unit performing an internal control for interpreting instructions and for correctly execution, an internal bus, and a cache.

The controller 130 determines the type of image using the initial image frame of the received image.

In particular, through the neural network, the controller 130 performs an operation on the image frame contained in the image. Information, which is inferred from the execution of the operation through the neural network, is used to determine the type of image. In addition, the controller 130 performs image processing based on the determined image type.

On the other hand, when (e.g., based on) the type of image is not able to be determined though the operation is performed on the entire image frame through the neural network, the controller 130 performs an operation on a cropped image frame through the neural network. A cropped image is an image that is cropped by resizing a photo or image frame to a desired size or separating one region from the photo or image when editing the photo or image.

That is, the controller 130 separates a region, in which it is easy to determine the type of image, from the image frame on which the operation is performed through the neural network, and the controller 130 performs the operation on the cropped image through the neural network. Therefore, the image processing apparatus 100 improves the accuracy of determining the type of image.

In the following description, performing an operation (i.e., calculation) through a neural network may refer to inputting an image frame to a neural network, and using the results inferred through the neural network. In addition, information according to the operation through the neural network may refer to information output from the neural network.

In addition to the above-described configuration, the image processing apparatus 100 may further include various configurations.

Figure 3:
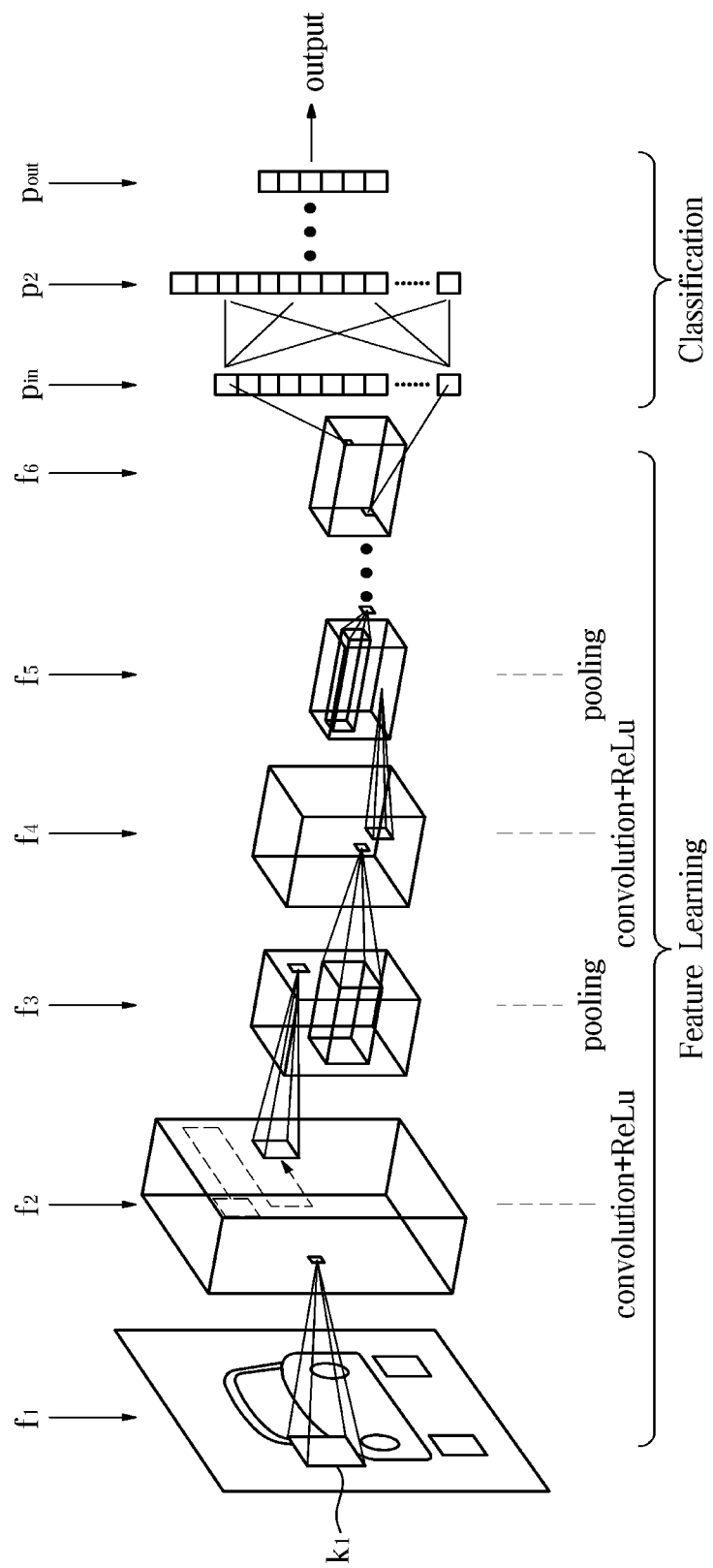
FIG. 3 is a view illustrating an example of a neural network.

FIG. 3 is a view illustrating an example of a neural network according to an embodiment.

Referring to FIG. 3, the neural network may include a Convolution Neural Network (CNN). In this case, as for the CNN, an image (or an image frame of an image, or a cropped image) is input as an input value, and an operation is divided into feature learning generating a feature map based on the input image and classification for determining the type of image with the generated feature map as an input value.

First, the classification may be configured as a multi-layer perceptron. Perceptron refers to the basic structure of machine learning that performs the same function as a neuron, which is the basic structure of the human neural network. That is, a perceptron is composed of a transfer function or an activation function using a modified input value acquired by multiplying an input value by a weight and adding a bias. Only the modified input value satisfying the threshold value of the activation function is output as the output value. Perceptron is a structure that is trained to infer a desired result value from a repeated input value, by adjusting a weight and a bias so that an output value to be output is a desired result value.

On the other hand, a basic perceptron may be composed of an input-layer Pin and an output-layer Pout. However, when a hidden-layer P2 is inserted in the middle, it becomes the multi-layer perceptron shown in FIG. 3. The multi-layer perceptron contained in the neural network adjusts the hidden layer P2 so that the output value, which is output from the output-layer Pout through the back propagation, approaches the desired result value, thereby improving learning ability.

To determine the type of image, the neural network may input each pixel value contained in the image frame of the game image to the input-layer Pin in the multi-layer perceptron. When an output value from the multi-layer perceptron is classified as a movie rather than a game, the neural network adjusts the weight and bias so that the next output value is updated to be a game.

On the other hand, each pixel value contained in the image is simply arranged and then input to the multi-layer perceptron performing the classification, and thus a performance result is degraded. Therefore, the neural network converts the received image into a feature map (feature learning) and inputs the feature map to the multi-layer perceptron to allow the multilayer perceptron to correctly classify the image.

The CNN, which is one example of the disclosed neural network, generates feature maps by using a convolution technique in feature learning. In particular, the CNN convolutes a feature map f1 using a kernel (K1 in FIG. 3). The kernel K1 includes a weight, and the output value reflected in the kernel has an activation function called a rectifier linear unit (Relu). The kernel K1 pools the largest value among the pixels satisfying Relu among the pixels of the image passed through the kernel K1, and generates another feature map f2. The generated feature map f2 is convulsed to another kernel in which the weight is changed, and the aforementioned process is repeatedly performed to generate a final feature map f6.

The CNN determines whether the final output value of the input feature map f1 is at least one of a game, an image player, and a browser. When the final output value of the input feature map f1 is different from the type of the actual image, the CNN is trained by adjusting at least one of the weight and the bias of the kernel and the multilayer perceptron.

The trained CNN is stored in the image processing apparatus 100 and when (e.g., based on) a frame of the image is input to the CNN, the type of image and the reliability value thereof are output as the inference result of the CNN. A detailed description thereof is described below with reference to the other drawings.

Meanwhile, CNN has been described as an example of the disclosed neural network. The above mentioned CNN has been described to be contained in supervised learning, but is not limited thereto. That is, the neural network used in the image processing apparatus 100 according to various embodiments is not limited to the CNN corresponding to the supervised learning, but may be implemented as the CNN contained in the unsupervised learning, and the other neural network including the Recurrent Neural Networks (RNN) algorithm.

Figure 4:
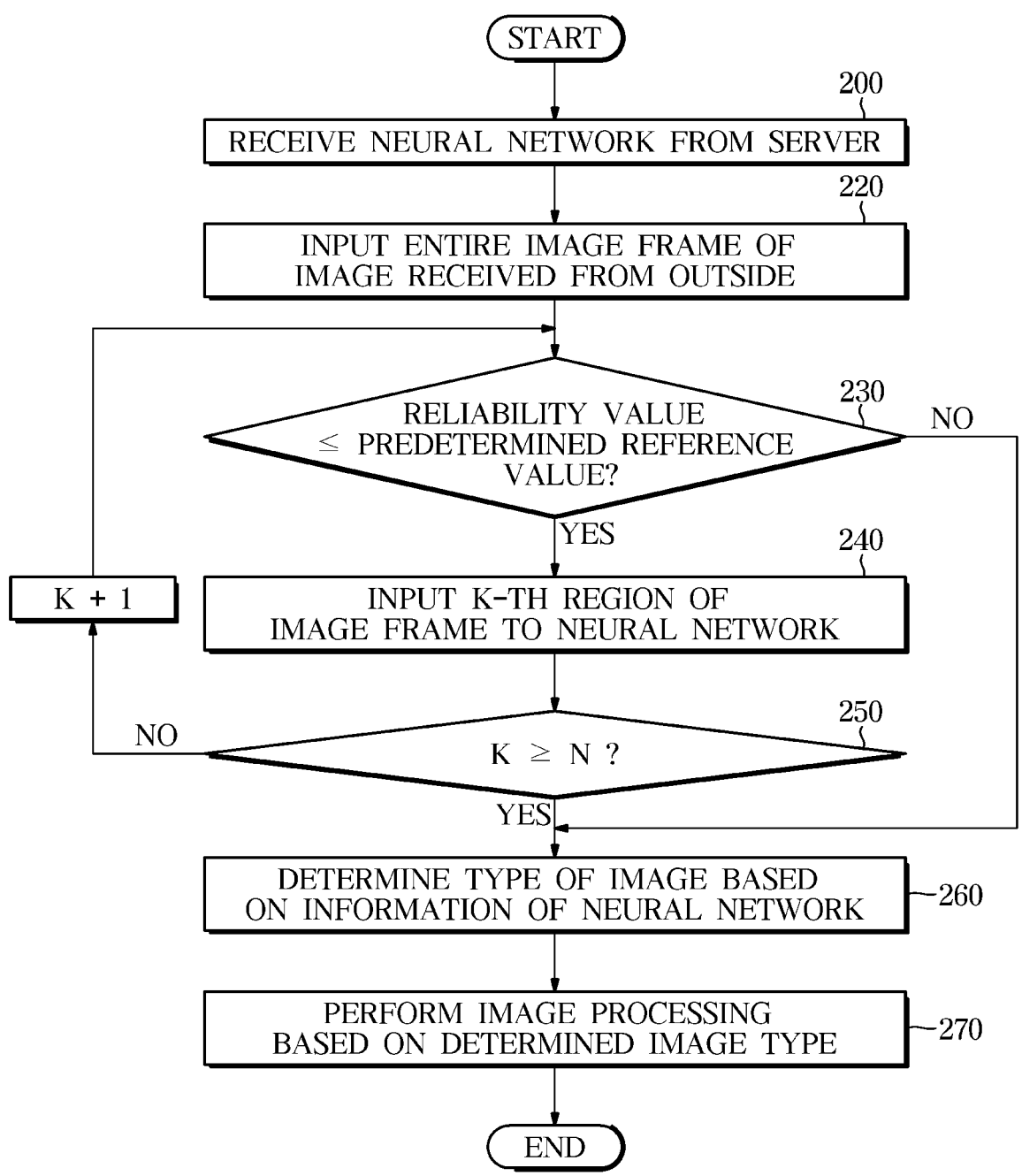
FIG. 4 is a flowchart of a control method according to an embodiment.

FIG. 4 is a flowchart of a control method according to an embodiment.

Referring to FIG. 4, the image processing apparatus 100 receives a neural network from the server 10 (operation 200).

The received neural network is stored in the storage 150 and then used by the controller 130 when (e.g., based on) the image is received. The neural network is received after being trained by the server 10. The neural network may be stored in various versions and sizes according to the size of the memory provided in the image processing apparatus 100 and the performance of the CPU.

An entire image frame contained in the image received from the outside is input to the neural network (operation 220).

It is sufficient that an image frame corresponds to at least one of the first image frame in the order in which the images are produced or image frames in a predetermined period. The image processing apparatus 100 inputs a first or initial image frame among a plurality of image frames contained in the image to the neural network to determine the type of image.

After the image frame is input, information output from the neural network may include the type of image and its reliability value. The image processing apparatus 100 compares the reliability value with a predetermined reference value (operation 230).

When the reliability value exceeds the predetermined reference value, the image processing apparatus 100 determines the type of the image included in the information output from the neural network as the type of the received image (operation 260).

However, when the reliability value is less than the predetermined reference value, the image processing apparatus 100 divides (e.g., crops) the input image frame. Thereafter, the image processing apparatus 100 inputs a cropped frame, that is, one region of the image frame, to the neural network (operation 240).

The image frame is divided based on a predetermined size and position, and the image processing apparatus 100 inputs the divided number N of regions into the neural network in a predetermined order. When a result of inputting a first region of the input image frame to the neural network is less than the reference value, the image processing apparatus 100 inputs a second region to the neural network (operation 250).

When (e.g., based on) the reliability value, which is output after the divided region is input to the neural network, exceeds the predetermined reference value, the image processing apparatus 100 determines the type of image having reliability higher than the reference value as the type of the received image.

When (e.g., based on) it is determined that the reliability value is equal to or less than the predetermined reference although all of the Nth frame regions are input, the image processing apparatus 100 determines the type of the received image based on information having the highest reliability among the plurality of reliability values that are output (operation 260).

The image processing apparatus 100 performs image processing based on the determined image type (operation 270).

In particular, the image processing apparatus 100 may determine whether to perform the FRC during various post-processing operations. For example, when the determined image type is a game image, the image processing apparatus 100 turns off the FRC function and displays the received image. As another example, when the determined image type is an image player such as a movie, the image processing apparatus 100 reproduces the received movie while performing the FRC.

Further, the image processing apparatus 100 may perform noise removal according to the determined image type. For example, when the input image is a movie, the image processing apparatus 100 may perform noise processing with a reference that is higher than when a browser image is input.

Meanwhile, at least one of the predetermined reference value, the number and the order of divided image frame regions may vary according to the user's input.

Figure 5:
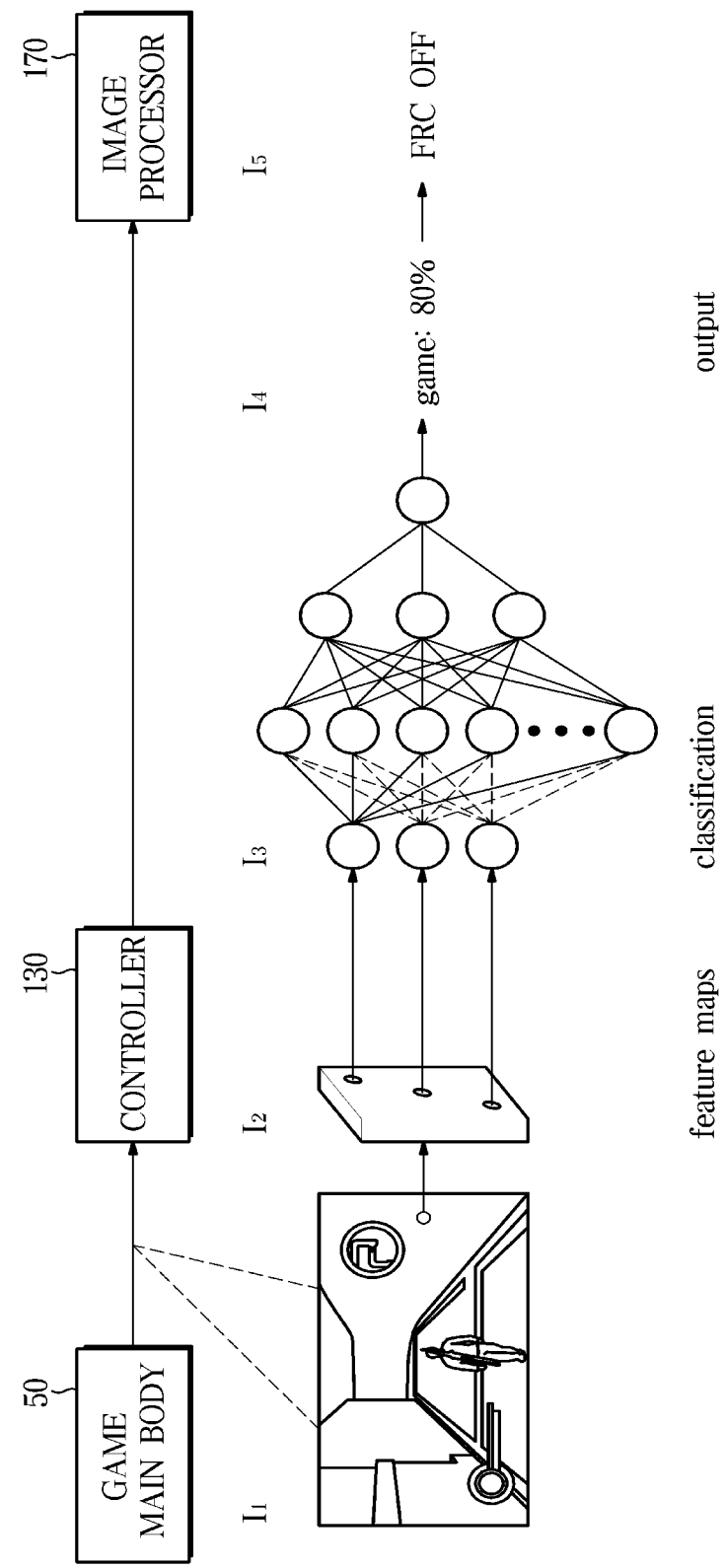
FIG. 5 is a view illustrating an output of the neural network according to an embodiment.

FIG. 5 is a view illustrating an output of the neural network according to an embodiment.

Referring to FIG. 5, the game console 50 transmits a game image to the image processing apparatus 100. The image processing apparatus 100 selects one initial image frame I1 from among several image frames contained in the received image. The controller 130 inputs the selected image frame I1 to the neural network.

As described above with reference to FIG. 3, the neural network converts the image frame I1 into a feature image I2 and inputs the feature image I2 into the multi-layer perceptron. The neural network may output that the input frame I1 is a game image and the reliability value is 80%.

In the present example, when the predetermined reference value is 70%, the output reliability value exceeds the reference value. Accordingly, the controller 130 determines the received image as a game image I4, and may reproduce the image on the display 110 without performing the FRC I5.

Figure 6:
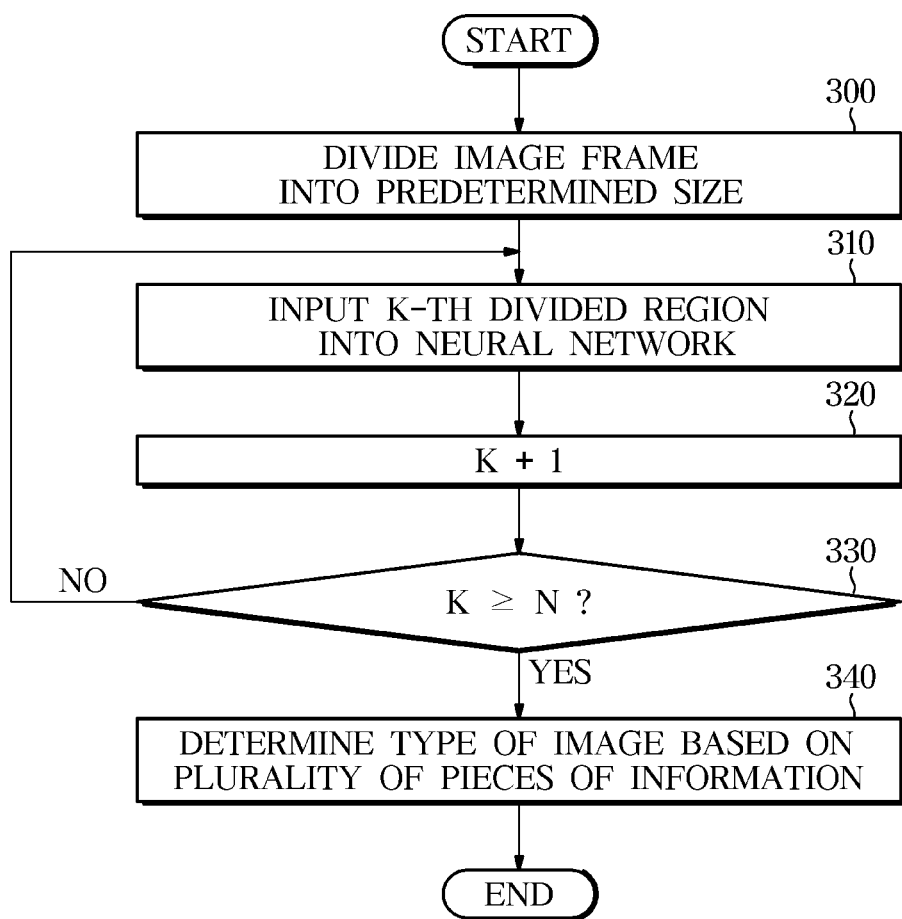
FIG. 6 is a flowchart of a control method according to another embodiment.

FIG. 6 is a flowchart of a control method according to another embodiment.

Unlike FIG. 4, an image processing device 100 may input the cropped image to the neural network and determine the type of image based on the result. The description the same parts as those shown FIG. 4 will be omitted.

Referring to FIG. 6, the image processing apparatus 100 divides the received image frame into a predetermined size (operation 300).

The image processing apparatus inputs a divided K-th region to the neural network (operation 310).

When a single image frame is divided into four different regions, the image processing apparatus 100 inputs a cropped frame region to the neural network in a predetermined order.

The image processing apparatus 100 compares the reliability value output from the neural network with the predetermined reference value based on the input K-th region (operation 320).

When (e.g., based on) the reliability value is less than the predetermined reference value, the image processing apparatus 100 repeatedly inputs the K+1th region to the neural network (operation 320). This is repeated until all the divided regions are input (operation 330).

The image processing apparatus 100 may input the plurality of regions of the image frame and store information output from the neural network in the storage 150.

The image processing apparatus 100 may determine the type of image based on the stored plurality pieces of information (operation 340).

For example, when a plurality of reliability values exceeding the reference value is present, the image processing apparatus 100 may determine the type of image having the highest reliability value among the plurality of reliability values exceeding the reference value, as the type of the received image. As another example, when all the plurality of reliability values is equal to or less than the reference value, the image processing apparatus 100 may determine the type of image having the highest reliability value among the plurality of reliability values or the type of image that is output the most number of types, as the type of image. Further, when all the plurality of reliability values is equal to or less than the reference value, the image processing apparatus 100 may determine the output value of the entire image frame that is predetermined in FIG. 4, as the type of image.

The method of combining or using a plurality of pieces of information may vary in various embodiments, and there is no limit to the method thereof as long as the image processing apparatus 100 is configured to use one region of the frame as an input for the neural network.

Figure 7:
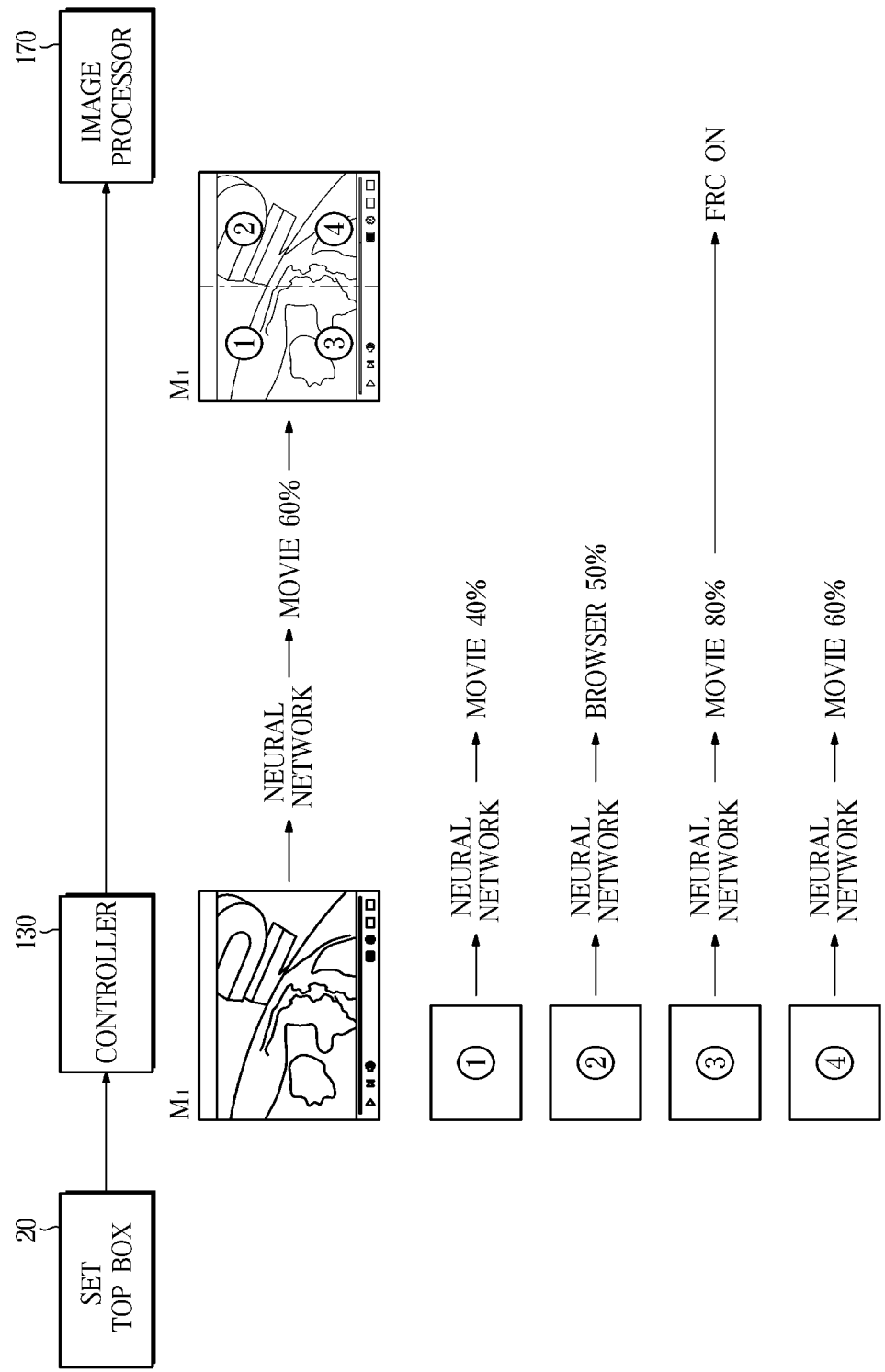
FIG. 7 is a view illustrating the embodiment of FIG. 6 in detail.

FIG. 7 is a view illustrating an example implementation of the embodiment of FIG. 6 in detail.

Referring to FIG. 7, the image processing apparatus 100 according to another embodiment may receive an image player image from the set-top box 20. The controller 130 inputs the entire initial image frame M1 contained in the image player image into the neural network, and the neural network may output that the type of image is a movie and the reliability value thereof is 60%. The output information may be stored in the storage 150.

Unlike the above mentioned description, the controller 130 may divide the image frame M1 into four regions, as illustrated in FIG. 6. When (e.g., based on) a predetermined order, such as from a region 1 to a region 4 of the image frame, is stored, the controller 130 inputs the image frame from the region 1 to the neural network.

For example, the neural network may infer that the type of image is a movie and the reliability value is 60% based on information on the region 1, and infer that the type of image is a browser and the reliability value is 50% based on information on the region 2. The neural network may infer that the type of image is a movie and the reliability value is 80% based on information on the region 3, and infer that the type of image is a movie and the reliability value is 60% based on information on the region 4.

The controller 130 may determine the type of image as an image player image (e.g., movie) based on the information of the region 3 after combining a plurality of pieces of information. Because the type of image is determined to be a movie, the controller 130 may control the image processor 170 to perform the FRC while reproducing the image player image.

On the other hand, the neural network may output that the type of image is a movie and the reliability value is 60% based on information on the region 3, which is different from FIG. 7 indicating that the type of image is a movie and the reliability value is 80% based on information on the region 3. In this case, because the reliability value does not exceed the reference value, the controller 130 may determine the type of image based on the region 4 having the highest reliability value. Alternatively, the controller 130 may input the entire image frame M1 into the neural network and combine output values, thereby determining the type of image.

Figure 8:
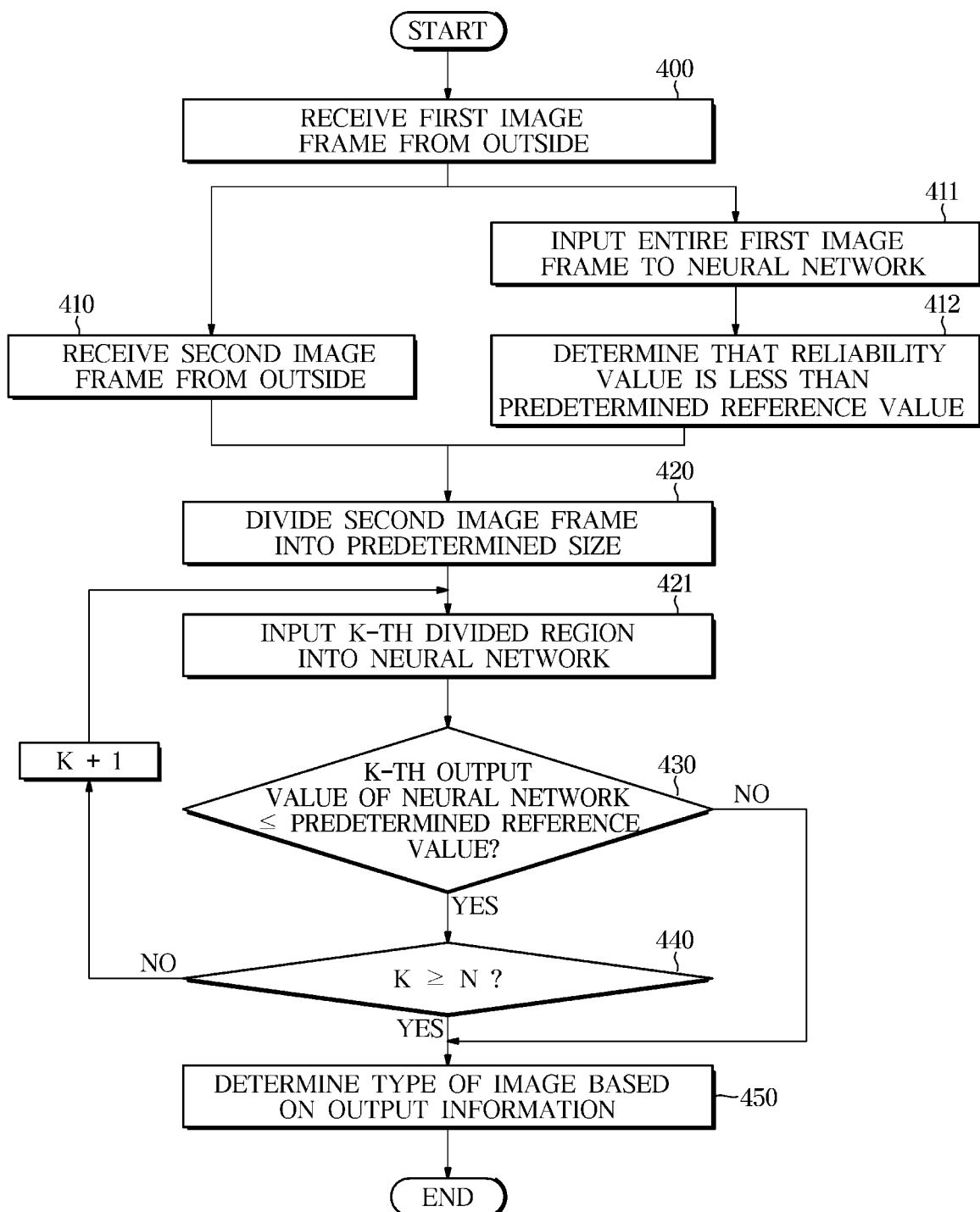
FIG. 8 is a flowchart of a control method according to still another embodiment.

FIG. 8 is a flowchart of a control method according to still another embodiment.

An image processing apparatus 100 may divide another image frame other than the selected one of the initial image frames, and input the divided image frame into the neural network to determine the type of image.

Referring to FIG. 8, the image processing apparatus 100 receives a first image frame contained in an image (operation 400).

The first image frame may be the first image frame contained in the received image, or may be an image frame reproduced after a predetermined period.

The image processing apparatus 100 inputs the received first frame to the neural network (operation 411).

After inputting the first image frame to the neural network, when (e.g., based on) an output reliability value is equal to or greater than the reference value, the image processing apparatus 100 may determine the type of image based on the output information. However, when the reliability value of the neural network based on the first image frame is less than the reference value, the following control method may be performed (operation 412).

While the neural network to which the first image frame is input performs the inference, the image processing apparatus 100 receives a second image frame (operation 410).

The second image frame is an image frame positioned after, e.g., by a predetermined period, the first image frame.

The image processing apparatus 100 divides the second image frame into a predetermined size N (operation 420). Further, the image processing apparatus 100 inputs a plurality of divided regions of the second image frames into the neural network in a predetermined order.

The image processing apparatus 100 inputs one of the plurality of regions (operation 421) and compares an output value output from the neural network with a predetermined reference value (operation 430).

When the reliability value of the neural network about the K-th region exceeds the predetermined reference value (operation 440:Y), the image processing apparatus 100 determines the type of image based on the output information (operation 450).

However, when the reliability value is less than the predetermined reference value, the image processing apparatus 100 inputs the K+1 th region into the neural network (440:N). Although all of the divided regions are input to the neural network, the reliability value may still not exceed the reference value. In this case, the image processing apparatus 100 may determine the type of image by combining the plurality of pieces of information output by the neural network (operation 450).

Figure 9:
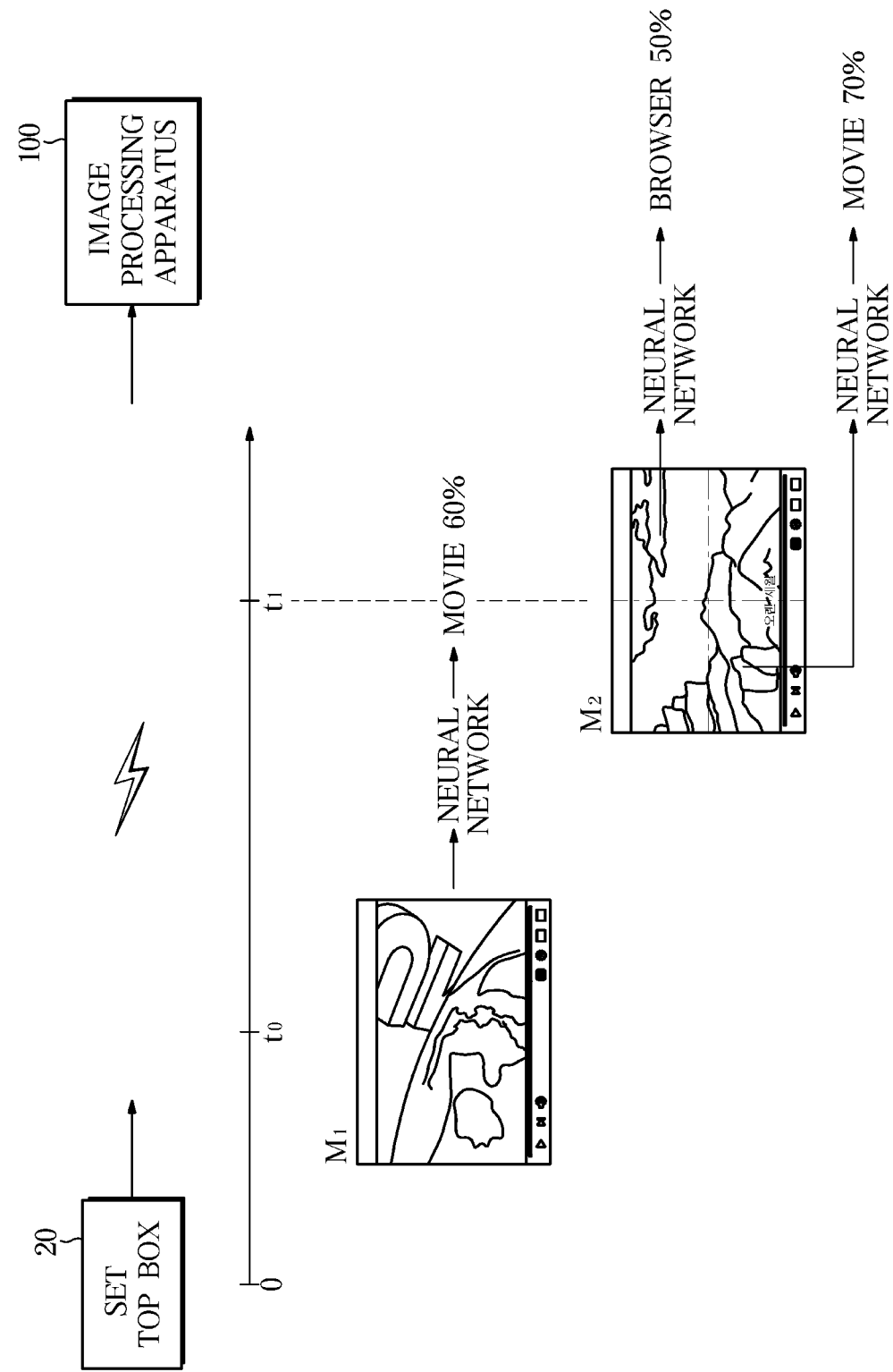
FIG. 9 is a view illustrating the embodiment of FIG. 8 in detail.

FIG. 9 is a view illustrating an implementation example of the embodiment of FIG. 8 in detail.

Referring to FIG. 9, a point of time at which the image processing apparatus 100 starts to receive an image player image from the set-top box 20 is set to zero. The received image is subjected to pre-processing such as demodulation so as to become the first image frame M1 and then the first image frame M1 may be input to the neural network at time t0.

At time t1, the neural network may output that the first image frame M1 is a movie with 60% reliability, that is, the type of image is a movie and the reliability value is 60%. The image processing apparatus 100 may not divide the first image frame M1 but may divide the second image frame M2 reproduced at time t1. The divided region may be input to the neural network in the predetermined order.

Alternatively, not all divided regions may be input to the neural network. When the stored neural network has a high probability of outputting a high reliability value in the experience of inferring the lower region of the frame, the image processing apparatus 100 may input only the region 3 or the region 4 among the divided regions, into the neural network.

Accordingly, the image processing apparatus 100 may reduce the time or improve accuracy of determining of the type of image.

FIG. 10 is a flowchart illustrating a control method according to another embodiment different from the above-described embodiment.

Referring to FIG. 10, an image processing apparatus 100 receives a first image frame from the outside (operation 500).

The image processing apparatus 100 inputs the entire first image frame or the divided region into the neural network (operation 512).

At the same time, the image processing apparatus 100 transmits the first image frame to the server 10 (operation 510). The server 10 receives the first image frame and inputs the first image frame to the neural network stored in the server 10. The server 10 may have a storage capacity and a performance ability of a CPU greater than that of the image processing apparatus 100. Therefore, the performance of the neural network stored in the server 10 may also have the inference capability having higher accuracy than the neural network stored in the image processing apparatus 100.

The image processing apparatus 100 receives information that is inferred from the first image frame and output by the server 10 (operation 511).

The image processing apparatus 100 compares the information output from the neural network stored in the storage 150 with the information received from the server 10 (operation 520).

The image processing apparatus 100 determines the type of image by combining the plurality of pieces of information (operation 530). The image processing apparatus 100 performs image processing based on the determined image type (operation 540).

The above-described embodiment may be effective when the communication speed between the server 10 and the image processing apparatus 100 is the same or faster than the inference time through the neural network in the image processing apparatus 100. For example, after considering the network condition of the communication circuitry 160, the image processing apparatus 100 may estimate a period of time in which the server 10 receives the first image frame, a period of time in which the inference is performed through the neural network stored in the server 10, and a period of time in which a result of inference is transmitted to the image processing apparatus 100 again. When (e.g., based on) the estimated time does not exceed a period of time in which the image processing apparatus 100 determines the type of image through the stored neural network, the image processing apparatus 100 may determine the type of image according to the embodiment of FIG. 10. It is understood, however, that embodiments are not limited to a consideration of communication time, and in another embodiment, the image processing apparatus 100 may transmit the first image frame (or a cropped region thereof) to the server irrespective of communication speed.

As is apparent from the above description, it is possible to determine the type of image in a limited on-device state by determining the type of image based on information that is output by inputting an initial frame to deep learning, and it is possible to secure the reliability of the determination.

Further, in accordance with one or more embodiments, it is possible to improve image quality and increase the satisfaction of the user by applying appropriate image post-processing according to the determined image type.

Meanwhile, it is understood that one or more embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions that can be decoded or executed by a computer are stored. For example, there may be a Read Only Memory (ROM), a Random Access Memory (RAM), a magnetic tape, a magnetic disk, a flash memory, and an optical data storage device.

Although embodiments have been shown and described above, it would be appreciated by those skilled in the art that changes may be made in these embodiments without departing from the principles and spirit of the present disclosure, the scope of which is defined at least in the claims and their equivalents.

What is claimed is:

1. An image processing apparatus comprising:
   a communication circuitry configured to communicate with an external device;
   a storage configured to store data;
   an image processor configured to perform image processing; and
   a controller configured to perform an operation, through a neural network, on an image frame contained in an image received by the communication circuitry, to determine a content type of the image based on information according to the operation through the neural network, and to control the image processor based on the determined content type of the image,
   wherein the information according to the operation through the neural network comprises the content type and a reliability value of the content type with respect to the image frame.

2. The image processing apparatus of claim 1, wherein the controller is configured to obtain a plurality of regions of the image frame based on at least one of a predetermined size and positions, and to perform the operation, through the neural network, on the obtained plurality of regions in a predetermined order.

3. The image processing apparatus of claim 2, wherein the image processor is configured to selectively perform at least one of noise processing or frame rate conversion (FRC).

4. The image processing apparatus of claim 3, wherein the controller is configured to determine whether to perform the FRC based on the determined content type of the image.

5. The image processing apparatus of claim 1, wherein based on all reliability values being less than a predetermined reference value, the controller is configured to determine the content type of the image based on a highest reliability value among the reliability values.

6. The image processing apparatus of claim 1, wherein the controller is configured to perform the operation, through the neural network, on a first image frame contained in the image, and based on the reliability value of the first image frame being less than a predetermined reference value, the controller is configured to perform the operation, through the neural network, on a second image frame, which is arranged a predetermined period after the first image frame.

7. The image processing apparatus of claim 1, wherein the communication circuitry is configured to receive a computer program for the neural network from a server, and the controller is configured to request, from the server, an operation process through the neural network.

8. The image processing apparatus of claim 7, wherein the controller is configured to perform the operation, through the neural network, on a first image frame contained in the image and to transmit the first image frame to the server, and after the first image frame is transmitted to the server, the controller is configured to determine the content type of the image by comparing a first reliability value resulting from the operation with a second reliability value received from the server.

9. The image processing apparatus of claim 7, wherein the controller is configured to request an updated neural network from the server.

10. The image processing apparatus of claim 1, wherein the neural network comprises a convolution neural network (CNN) generating a feature map that is output by performing convolution on the image frame, and wherein the generated feature map is subsequently input into the neural network.

11. The image processing apparatus of claim 1, wherein the storage stores a computer program related to the neural network, and the controller is configured to perform the operation through the neural network based on the stored computer program.

12. A control method of an image processing apparatus, the control method comprising:
  performing an operation, through a neural network, on an image frame contained in an image;
  determining a content type of the image based on information according to the operation through the neural network; and
  performing image processing based on the determined content type of the image,
  wherein the information according to the operation through the neural network comprises the content type and a reliability value of the content type with respect to the image frame.

13. The control method of claim 12, wherein the performing the operation comprises:
  obtaining a plurality of regions of the image frame based on at least one of a predetermined size and positions; and
  performing the operation, through the neural network, on the obtained plurality of regions in a predetermined order.

14. The control method of claim 12, wherein the performing the image processing comprises selectively performing at least one of noise processing or frame rate conversion (FRC).

15. The control method of claim 12, further comprising:
  storing a computer program performing the operation through the neural network.

16. The control method of claim 12, wherein the performing the operation comprises requesting the performing of the operation, through the neural network, to a server.

17. A non-transitory computer-readable recording medium having recorded thereon instructions executable by at least one processor to perform the control method of claim 12.

18. An image processing apparatus comprising:
  an image processor configured to perform image processing on an image; and
  a controller configured to perform an operation, through a neural network, on an image frame contained in the image to determine a content type of the image, and to control the image processor to perform the image processing based on the determined content type of the image,
  wherein the controller is configured to obtain, as an output of the operation from the neural network, the content type and a reliability value of the content type with respect to the image frame.

19. The image processing apparatus of claim 18, wherein:
  based on the reliability value being greater than a predetermined reference value, the controller is configured to determine the content type.

20. The image processing apparatus of claim 18, wherein the controller is configured to crop the image frame and perform the operation, through the neural network, on the cropped image frame.

21. The image processing apparatus of claim 18, wherein the controller is configured to control the image processor to selectively perform at least one of noise processing or frame rate conversion (FRC) based on the determined content type of the image.

22. The image processing apparatus of claim 18, wherein based on all reliability values being less than a predetermined reference value, the controller is configured to determine the content type of the image based on a highest reliability value among the reliability values.

* * * * *